June 27, 1967     J. WARWICK     3,327,819
TORQUE TRANSMITTING DEVICE

Filed Oct. 20, 1965     2 Sheets-Sheet 1

INVENTOR
JOHN WARWICK
BY
*Ernest A. Joeun*
ATTORNEY

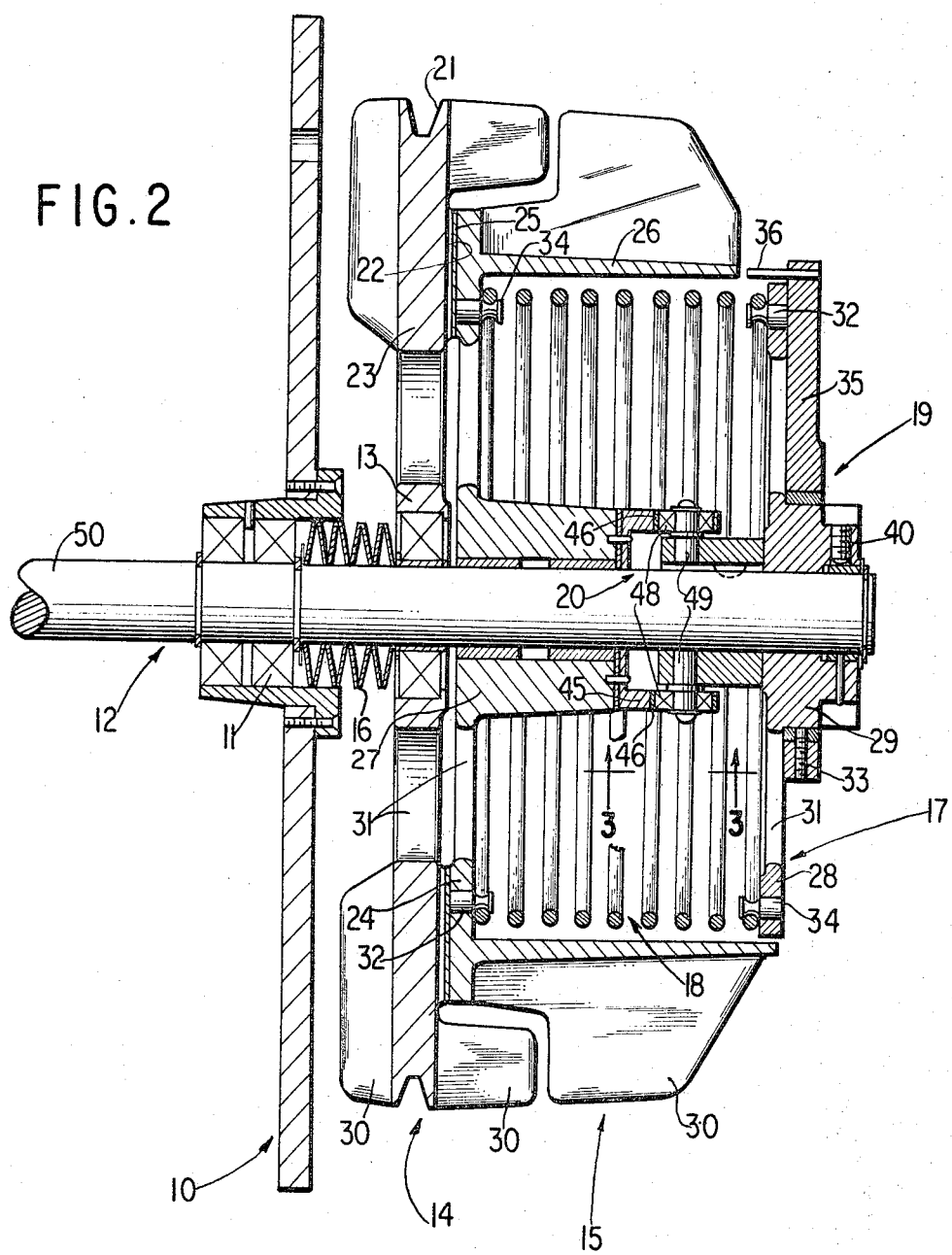

United States Patent Office 3,327,819
Patented June 27, 1967

3,327,819
TORQUE TRANSMITTING DEVICE
John Warwick, Livingston Township, Essex County, N.J., assignor to Compensating Tension Controls, Inc., East Orange, N.J., a corporation of New Jersey
Filed Oct. 20, 1965, Ser. No. 498,265
11 Claims. (Cl. 192—30)

The present invention relates to devices such as clutches or brakes for frictionally transmitting torque between two members, and more particularly to an improved device for maintaining the torque substantially constant.

It is known that the coefficient of friction of surfaces of given materials varies over a considerable range upon changes in temperature and humidity and aging and wear of the materials. When a slip clutch is utilized for driving a member on which a web or strand is wound, the slip between the friction surfaces is only about 10% at the beginning of winding and increases as the wound web increases in diameter so that the slip at the end of winding may be as high as about 90%. As the slip increases the heat of friction increases and the temperature of the friction surfaces increases accordingly whereby the coefficient of friction varies drastically from the beginning to the end of winding. Also, the coefficient of friction varies with changes in drive speed and for this reason slip clutches are limited to a range of speed unless the clutch liners are replaced by liners having a different coefficient of friction which permits the clutch to operate at another range of speed. Furthermore, the clutch ratio is limited by the speed of rotation.

Accordingly, an object of the present invention is to provide a constant torque device which overcomes the foregoing difficulties and disadvantages.

Another object is to provide such a device which maintains the output torque constant regardless of the speed of operation and changes in temperature and humidity of the friction surfaces.

Another object is to provide such a device which is simple, durable and economical in construction and is reliable in operation.

A further object is to provide such a device which can be built in a wide range of sizes and can be adjusted to provide a wide range of constant torque.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 2 is a sectional view taken along the line 2—2 on FIG. 1.

Figure 1:
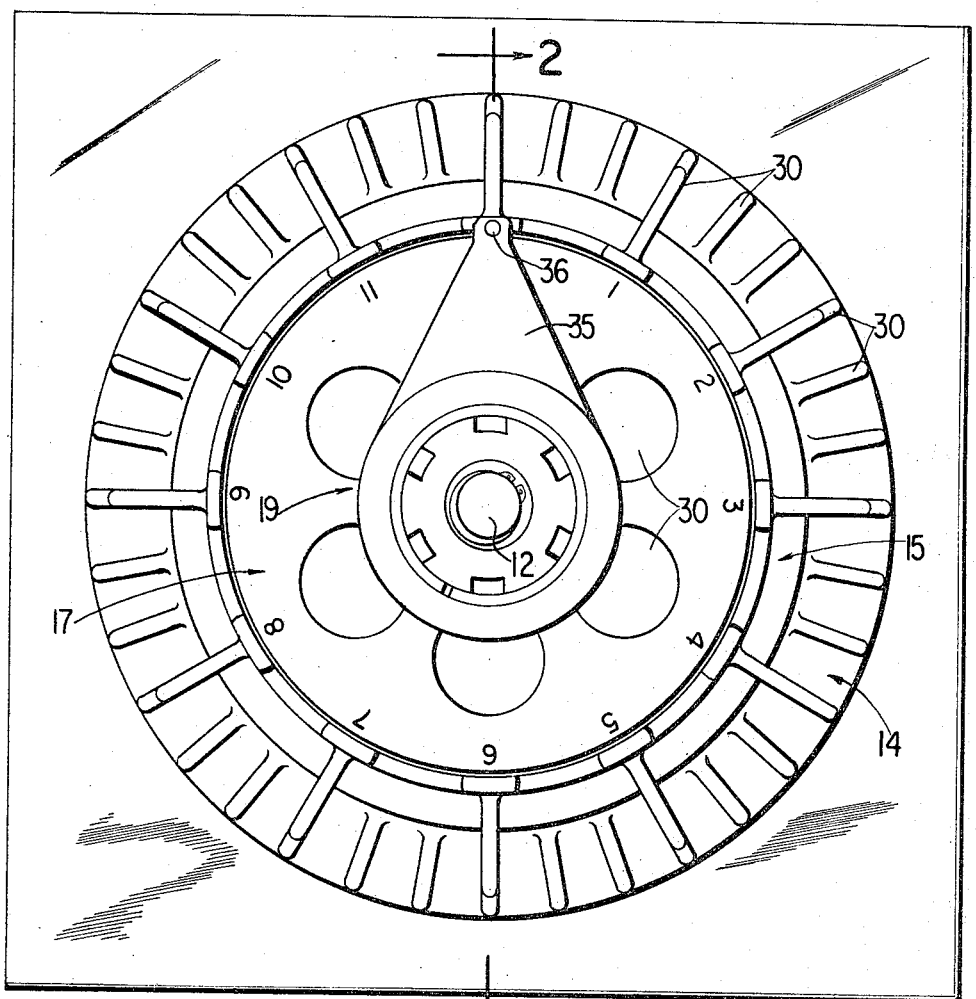
FIG. 1 is an end elevational view of a device in accordance with the present invention.

Referring now to the drawings in detail, there is shown a device which generally comprises a mounting frame or plate 10, a bearing 11 supported by the plate, a shaft 12 rotatably journalled in the bearing, a first member 14 mounted for rotation about and sliding movement on the shaft, a second member 15 engaging the member 14 and being mounted for sliding and turning movement on the shaft, a yieldable element 16 for urging the member 14 into engagement with the member 15, a third member 17 secured to the shaft for rotation therewith, a torsion spring 18 having one end secured to the member 17 and having its other end secured to the member 15 to provide a driving connection, an arrangement 19 for maintaining the loading of the spring 18, and a cam arrangement 20 providing a connection between the member 17 and the member 15 for the purpose described hereinafter.

The yieldable element 16 may be a Belleville washer through which the shaft 12 extends and which has its outer end in engagement with fixed structure and has its inner end biased against the clutch member 14. The element 16 serves to cushion the member 14 when forces are applied thereto by the member 15 and serves as a shock absorber in a sense to absorb a hard push by the member 15. This provides a breathing action for the member 14.

The member 14 is in the shape of a pulley, and is provided with an annular groove 21 for receiving a drive belt (not shown). This member includes a hub 13 rotatably and slidably mounted on the shaft 12 and a disc section 23 on the hub provided with an annular inwardly facing face 22.

The member 15 includes a disc section 24 carrying an outwardly facing annular friction liner 25 for engaging the face 22, a hollow generally cylindrical section 26 on the disc section for housing the spring 18, and a hub 27 mounted for sliding and turning movement on the shaft 12.

The member 17 includes a disc section 28 on a hub 29 which is secured to the shaft 12 for rotation therewith.

In order to carry away the heat caused by friction between the face 22 and the liner 25, the members 14 and 15 are provided with circumferentially spaced, radially extending fins 30 for dissipating such heat to the ambient atmosphere and moving the heated ambient air away from the fins. Also, the disc sections 23, 24 and 28 are each formed with a plurality of openings 31 for allowing cooling air to circulate therethrough to carry away heat due to friction.

The spring 18 is of the cylindrical helical type and is housed within the cylindrical section 26. One end of the spring 18 is secured to a stud or post 32 on the disc section 24 of the member 15 and the other end is secured to a similar stud or post 32 on the disc section 28 of the member 17 to provide a driving connection between the members 17 and 15. If desired, additional studs or posts 34 may be provided on the disc sections 24 and 28 for supporting the end convolutions of the spring 18.

The stop arrangement 19 includes an arm 35 releasably secured to the hub 29 of the member 17 by a set screw 33, and an axially extending rod or pin 36 near the outer end of the arm which can move between the first and eleventh fin on the member 15 (the free end 37 of the twelfth fin being cut away as shown at the upper right-hand portion of FIG. 1). This prevents the spring from unwinding completely when the device is idle, and enables the pin 36 to float between the first and eleventh fin. A set screw 40 on the hub 29 is provided for releasably engaging the shaft 12. Thus, when the set screws 33 and 40 are released the member 17 can be turned with respect to the member 15 and about the shaft 12 to vary the loading of the spring 18.

Figure 3:
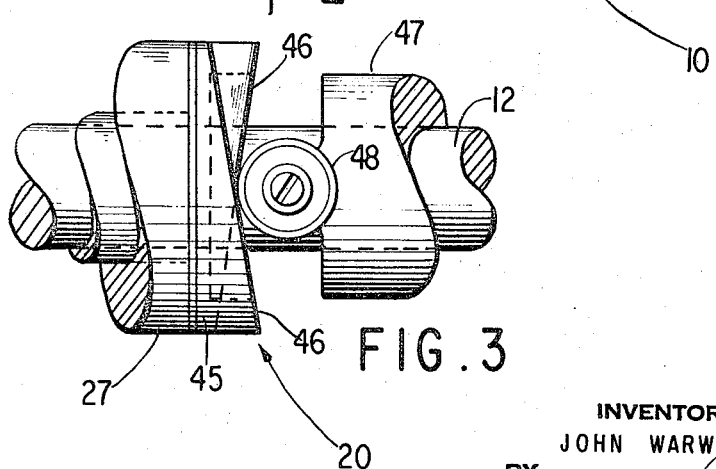
FIG. 3 is an enlarged framentary elevational view of cam means as seen along the line 3—3 on FIG. 2.

As best shown in FIGS. 2 and 3, the cam arrangement 20 comprises a circular cam member 45 secured to the clutch member 15 and having two 180° arcuate sections 46 facing the member 17, and a yoke 47 secured to the shaft 12 and carrying diametrically opposite roller members 48 each adapted for engaging one of the cam sections 46 to thereby serve in effect as cam followers and cause the cam member 45 to vary the thrust of the clutch member 15 against the clutch member 14. The incline of the cam sections is such that a high mechanical advantage is attained (on the order of about 130/1) whereby a force of considerable magnitude is exerted by the liner 25 of the member 15 on the face 22 of the member 14 upon slight turning of the cam with respect to the rollers.

When the member 14 is driven by a belt and the shaft serves to drive a drum or the like (not shown) for winding up a web or sheet material or a strand, the device serves as a clutch providing a substantially constant output torque for the shaft 12.

During such use, the rollers 48 are initially positioned midway on the cam sections 46 with the pin 36 facing the twelfth fin on the member 15 and the spring 18 being wound up to exert a predetermined torque equal to the torque to be exerted by the winding drum on the shaft 12. When so arranged, the member 14 drives the member 15 to exert a torque which is equal to the torque exerted by the spring 18 tending to drive the member 15 in the opposite direction. Thus, when the coefficient of friction between the members 14 and 15 tends to change, the change in slip between these members causes the member 15 to change its rotational relationship to the member 17 to operate the cam arrangement. Thus, the rollers 48 will seek a different position on the cam faces 46 thereby changing the amount of pressure the member 15 exerts on the member 14. It will be appreciated that by maintaining the torque constant the tension of the web being wound will be maintained constant.

In practice, it has been found that the torque varies about 1% plus or minus from the beginning to the end of winding up the web regardless of temperature and humidity changes and at all rotational speeds. Also, the clutch ratio is infinite, and breaking in and wear of the friction surfaces is compensated by the foregoing described arrangement.

As a specific example a torque of between 24.7 to 25.3 pounds was maintained while about 1.5 horsepower was transmitted at about 796 r.p.m. through a friction liner having a mean diameter of 9.5 inches with the coefficient of friction varying between about 0.15 and 0.3. The cam sections 46 employed had a height of about 0.116 inch in 180° and served to provide a mechanical advantage of about 130/1.

It also has been found that the device in accordance with the present invention can be utilized for applying a constant braking torque on the shaft 12 when the shaft carries one roller of a pair of nip rollers (not shown) through which a web is drawn for applying constant tension to the web. When the device is used in this manner, a pin 51 is inserted into a hole 52 in the frame-plate 10 to extend between adjacent fins on the member 14 and thereby restrain the member 14 against rotation about the shaft 12; and no means for rotating the member 14 are provided. Now, should the torque exerted by the web on the shaft 12 tend to vary, the member 17 will be turned to operate the cam to adjust the pressure of the member 15 on the member 14 to provide a substantially constant braking force for the shaft 12.

From the foregoing description, it will be seen that the present invention provides a simple and practical device which compensates for changes in the coefficient of friction between friction members which changes are due to any change in condition which might vary the coefficient of friction.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a clutch, the combination of a frame, a shaft rotatably mounted on said frame, a first clutch member mounted for rotation about said shaft and for sliding movement on said shaft, a second clutch member frictionally engaging said first clutch member and being mounted on said shaft for sliding and turning movement on said shaft, a drive member secured to said shaft for rotation therewith, a torsion spring having one end secured to said drive member and having its other end secured to said second clutch member to provide a driving connection between said drive member and said second clutch member, frictionless cam means providing a mechanical advantage connected between said drive member and said second clutch member for effecting movement of said second clutch member to vary the force exerted by it on said first clutch member in response to turning movement of said second clutch member with respect to said drive member to thereby compensate for changes in the coefficient of friction of said clutch members and thus apply a substantially constant torque on said shaft, and spring means between said frame and said first clutch member to cushion said first clutch member against forces applied by said second clutch member on said first clutch member, said torsion spring having a much larger diameter than said cam means.

2. In a clutch according to claim 1, wherein said drive member includes means for adjustably securing the same on said shaft to vary the loading of said spring.

3. In a clutch according to claim 1, wherein at least one of said clutch members has heat dissipating surfaces adjacent the periphery thereof.

4. In a clutch according to claim 1, wherein both of said clutch members have heat dissipating surfaces at the periphery thereof.

5. In a clutch according to claim 1, wherein said first clutch member has means by which the same is driven whereby the clutch controls the output of said shaft.

6. In a clutch according to claim 1, wherein said cam means include a cam having a plurality of equally spaced arcuate surfaces and equally spaced cam follower rollers engaging said cam surfaces.

7. In a clutch according to claim 6, wherein said cam surfaces are two 180° sections and said cam follower means includes two diametrically opposite rollers each engaging one of said cam surface sections.

8. In a device of the class described, the combination of a frame, a first member having a friction surface, a shaft rotatably mounted on said frame and extending through said first member for rotation with respect to said first member, said first member being mounted for sliding movement on said shaft, a second member having a friction surface engaging the friction surface of said first member and being mounted on said shaft for rotatable and slidable movement with respect to said shaft, a third member secured to said shaft for rotation therewith, a torsion spring having one end secured to said second member and having its other end secured to said third member to provide a driving connection between said second and third members, frictionless cam means providing a mechanical advantage connected between said second and third member for effecting movement of said second member to vary the force exerted by it on said first member in response to turning movement of said second member with respect to said third member to thereby compensate for changes in the coefficient of friction of said friction surfaces and thus apply a substantially constant torque on said shaft, and spring means between said frame and said first member to cushion said first member against forces applied by said second member on said first member, said torsion spring having a much larger diameter than said cam means.

9. In a device according to claim 8, wherein said first member is rotated whereby the device serves as a clutch for driving said shaft.

10. In a device according to claim 8, wherein said first member is restrained against rotation with respect to said frame whereby the device serves as a brake acting on said shaft.

11. In a clutch according to claim 6, wherein said cam surfaces are shaped to provide a high mechanical advantage.

References Cited

UNITED STATES PATENTS

| | | | |
|---|---|---|---|
| 1,256,947 | 2/1918 | Stampen | 64—29 X |
| 1,322,119 | 11/1919 | Kiwul | 64—29 |
| 2,151,724 | 3/1939 | Wengel et al. | 64—30 |
| 2,983,124 | 5/1961 | Spase | 64—30 |
| 3,004,411 | 10/1961 | Bugel | 64—30 X |
| 3,213,645 | 10/1965 | Pease | 64—30 |

MARK NEWMAN, *Primary Examiner.*

ARTHUR T. McKEON, *Examiner.*